UNITED STATES PATENT OFFICE.

BARTLETT ARKELL, OF CANAJOHARIE, NEW YORK, ASSIGNOR OF ONE-HALF TO BEECH-NUT PACKING COMPANY, OF CANAJOHARIE, NEW YORK, A CORPORATION OF NEW YORK, AND ONE-FOURTH TO WILLIAM A. LORENZ AND ONE-FOURTH TO WILLIAM H. HONISS, BOTH OF HARTFORD, CONNECTICUT.

ART OF TREATING CONSERVES.

1,037,103. Specification of Letters Patent. Patented Aug. 27, 1912.

No Drawing. Application filed September 17, 1906. Serial No. 334,873.

*To all whom it may concern:*

Be it known that I, BARTLETT ARKELL, a citizen of the United States, and resident of Canajoharie, in the county of Montgomery and State of New York, have invented certain new and useful Improvements in the Art of Treating Conserves, of which the following is a full, clear, and exact specification.

This invention is an improvement in the art of treating various kinds of food products, and particularly fruit syrups, juices, jellies, and conserves generally, to protect them against the effects of molds, ferments and deleterious agents, and to preserve the natural purity, flavor, consistency, attractive appearance, and in general all the desirable qualities and properties of the food. Hence this invention is especially useful in the preserving of unadulterated food, without the use of chemical preservatives. There are various agencies which are liable to operate injuriously upon these food products, after they are bottled, canned, or otherwise packaged for preservation and sale. I have, however, discovered that these food products or materials when treated in accordance with this invention are free from the effects of these deleterious agencies.

It will be necessary to vary the treatment somewhat to adapt it to different products and different seasons; but generally speaking, that treatment consists in putting the food products while their mass is in a sterile condition, into receptacles, then partially exhausting the receptacles by mechanical means and hermetically sealing them, and then heating the unfilled space within the receptacle to a sterilizing temperature.

In carrying out this improved treatment or process, I preferably employ glass jars or tumblers or other glass receptacles, provided with a vacuum sealing closure.

It is practically impossible to avoid the presence of an unfilled space in the sealed package, of greater or less extent, even when initially completely filled, on account of the shrinkage of its contents in cooling, or because of the upwardly dished form of the closure. This unfilled space, and perhaps also the adjacent surface of the material and of the closure, appears to be liable to invasion by trouble making germs, during the filling of the receptacle, or thereafter, even though the mass of the material may, at the time of filling, be in a practically sterile condition.

In carrying out this improved treatment or process, the material is put into the receptacles while it is in a generally sterile condition, and preferably while at a heat sufficient to sterilize the general mass. The receptacles are then preferably covered with their respective closures, and then allowed to stand and cool to some extent before exhausting and sealing the receptacles, which is the next step in the process. The time which should intervene between the filling of the receptacles and their final sealing varies somewhat with different material, the consistency of the materials and with the the size of the receptacles.

The vacuum sealing operation is preferably performed by placing the receptacles in a vacuum chamber or retort, which is then hermetically sealed and the air exhausted therefrom by a pump or other mechanical means. If subjected to this operation while still at too high a heat, an ebullient condition is liable to be induced within the receptacle as soon as the atmospheric pressure is sufficiently removed, thereby leaving the contents in a more or less frothy or bubbly condition in the case of liquids, and in the case of conserves or other material having a thicker consistency, leaving them more or less disrupted or broken up, sometimes with bubbles imprisoned in the mass of the material, all of which detracts from their appearance when put up in glass bottles or jars. Hence it is desirable to avoid carrying the mechanical exhaustion to the point of ebullition; and as that point recedes with the cooling of the material, thereby permitting a higher vacuum to be obtained without reaching the point of ebullition, the operation of mechanically exhausting the receptacles may advantageously be deferred until the material has cooled to a point which permits of obtaining the desired degree of vacuum without reaching the point at which an ebullient condition is induced. The degree of exhaustion to which the sealed receptacles should or may be subjected also varies with different materials, aside from their temperature above referred to. Those of thick consistency such as conserves, or of delicate structure such as jellies, are liable to be disrupted more or less by too high a vacuum, even when quite cool, presumably through the expansion of the air which is liable to be more or less imprisoned in the mass of the material, thereby exhibiting a broken-up appearance in some instances, or a bubbly appearance in other instances, in either case detracting from the appearance of the goods, as seen through the glass wall of the jar or bottle. The general rule, therefore, is to carry the degree of exhaustion as far as practicable without inducing a broken-up or bubbly appearance in the material, so as to obtain as secure a vacuum seal as is compatible with other conditions, it being understood, as implied by its name, that the vacuum closure is held in place by the pressure of the external atmosphere, the force and security of which is proportionate to the degree of vacuum in the receptacle. Moreover, and aside from its mechanical security, I consider it desirable to obtain approximately the highest degree of vacuum permissible with each kind of material, in order to protect them against the operations of those destructive agents and organisms whose growth and development is most retarded by a vacuum.

The final step in my improved treatment consists in subjecting the sealed jars to the action of heat at a temperature and for a time sufficient to sterilize the aforesaid unfilled spaces, and incidentally the adjacent surface of the material and receptacle. The degree of heat and the length of time must be adapted to the size and character of the receptacle and of its closure, and having due regard to their heat transmitting properties. When a metallic cap is employed for a closure, and the unfilled space remains adjacent to the cap, the degree of heat and the time of application thereof may, on account of the superior heat conducting properties of metal, be considerably less than in cases where the unfilled space must be reached through glass or other substances which conduct heat more slowly, as when a non-conducting closure is employed, or when the space passes away from the metallic closure, due to the inversion of the jar. Various ways may be employed for applying heat, according to the shape, size and other characteristics of the sealed receptacles. The jars may be placed in boiling or hot water, or in a closed steam chamber to which steam is admitted under such pressure and for such a time as may be necessary to insure the proper sterilization of the unfilled space; the adjacent surfaces of the material and the inner side of the cap or closure.

In most instances it is desirable to avoid reheating the mass of the material to any considerable extent. Various means may be employed for directing or applying the heat to the desired portions of the jar, so as to act upon the unfilled space, while avoiding as far as possible communicating a high degree of heat to the mass of the material. This may be done by protecting the body of the receptacles in various ways. When the form of the receptacle and the consistency of the material are such that the latter will not fall upon inverting the jars, they may be inverted in a shallow pan or kettle of boiling or hot water. In this case, and especially when a metallic closure is employed, the heat is transmitted promptly and directly to and through the unfilled space to the adjacent surfaces of the material and of the closure, while the non-conducting properties of the glass protect the mass of the material, which is thus mainly above the level of the water. In treating liquids, or other materials which on account of their light consistency, or on account of the form of the receptacle, would fall when inverted, they may be treated right side up, in various ways, as for example, in boiling water, or in a closed steam chamber, as above described. When, however, it is desired, as above indicated, to apply the sterilizing heat only to the closure, or to the unfilled space, the body portion of the jar containing the mass of material may be protected, while in the steam chamber, by setting the jars into close fitting holes in a protecting diaphragm or partition, which is adapted to expose the desired portions to the sterilizing action, while protecting the remaining portions. Or the body portions of the jars may be protected by setting them right side up in a pan or tank of cool or cold water, leaving exposed above the water only the portions thereof which are to be subjected to the sterilizing action, and then turning steam at the proper temperature and for the requisite time into the closed space above the water, and around the tops of the jars. In many ways, this improved treatment may, and should be adapted to different material, or to different receptacles, or to other different conditions as skill and experience may suggest.

The terms "sterile" and "sterilizing", as employed in this specification, are used in a relative, and not necessarily an absolute sense. It is believed that some of the trouble making germs or spores which are liable to invade these food products are entirely killed by the sterilizing process as herein set forth; whereas there may be others which survive the sterilizing process, unless the latter is carried to a degree of temperature which would injure the food. Hence it cannot be said with certainty that the material is in an absolute sense completely "sterile" or "sterilized". But it is believed that the trouble making germs which may survive the sterilizing process are mainly or wholly of kinds or species which find the conditions of the continued high vacuum unfavorable to their development and activities.

I claim as my invention:—

1. The process of preserving food material, which consists in putting the material while in a sterile condition into a receptacle, then partially exhausting and hermetically sealing the receptacle, and then heating the unfilled interior space of the receptacle to a sterilizing temperature without heating the mass of the material to that temperature.

2. The process of treating food material, which consists in putting the material while at a sterilizing temperature into a receptacle, then partially exhausting and hermetically sealing the receptacle, and then heating the closure and the adjacent space within the receptacle, to a sterilizing temperature without heating the mass of the material to that temperature.

3. The process of treating food material, which consists in putting the material while in a sterile condition into a sterilized receptacle, then mechanically exhausting and hermetically sealing the receptacle, and then heating the unfilled space and the adjacent interior space of the receptacle to a sterilizing temperature while keeping the mass of the material at a much lower temperature.

4. The process of treating food material, which consists in putting the material while at a sterilizing temperature into a receptacle, then substantially reducing the temperature of the material, then exhausting and hermetically sealing the receptacle, and then heating the surface of the material within the receptacle to a sterilizing temperature while keeping the mass of the material at a reduced temperature.

5. The process of treating food material, which consists in putting the material while at a sterilizing temperature into a receptacle, then reducing the temperature of the material, then exhausting and hermetically sealing the receptacle at a vacuum approximating that which would cause disruption of the material, and then heating the closure and the mouth end of the receptacle to a sterilizing temperature while keeping the mass of the material at a reduced temperature.

6. The process of treating food material, which consists in putting the material while at a sterilizing temperature into a receptacle, then exhausting and hermetically sealing the receptacle at a vacuum below that which would cause ebullition or disruption of the material, and then heating the closure and the adjacent mouth portion of the receptacle to a sterilizing temperature while keeping the mass of the material below a temperature which would cause ebullition.

7. The process of treating food materials, which consists in putting the material while at a sterilizing temperature into a receptacle, then reducing the temperature of the material, then partially exhausting and hermetically sealing the receptacle, and then heating the unfilled space within the receptacle to a sterilizing temperature while keeping the mass or body of the material at a lower temperature.

8. The process of treating food material, which consists in putting the material while at a sterilizing temperature into a sterilized receptacle, then reducing the temperature of the material, then exhausting and hermetically sealing the receptacle, and then heating the unfilled space within the receptacle to a sterilizing heat, while keeping the main body or mass of the materials at a lower temperature.

9. The process of treating food material, which consists in putting the material while at a sterilizing temperature into a receptacle, then reducing the temperature of the material, and then inverting the receptacle and subjecting its closure end to a sterilizing heat without substantially increasing the temperature of the mass of the material.

10. The process of treating food material, which consists in putting the material while at a sterilizing temperature into a sterilized receptacle, then reducing the temperature of the material, then exhausting and hermetically sealing the receptacle, and then inverting the receptacle and placing its closure end in hot water to sterilize the inner side of the closure and the space or surface adjacent thereto without materially reheating the mass of the material.

11. The process of treating food material, which consists in putting the material while its mass is at an approximately sterilizing temperature, into a glass jar, then exhausting and hermetically sealing the jar with a metallic closure, and then inverting the jar and placing its metallic closure in hot water to sterilize the inner side of the closure and the space and surfaces adjacent thereto without materially reheating the mass of the material.

In testimony whereof, I have signed my name to this specification in the presence of two subscribing witnesses, this 11th day of September, 1906.

BARTLETT ARKELL.

Witnesses:
  GEO. L. LEWIS,
  DANIEL E. WING.